[19] United States Patent
DiFranco

[11] Patent Number: 4,494,896
[45] Date of Patent: Jan. 22, 1985

[54] SUPPORT BAR
[75] Inventor: Dioniso DiFranco, Oakville, Canada
[73] Assignee: Peel Truck & Trailer Repair Ltd., Mississauga, Canada
[21] Appl. No.: 460,278
[22] Filed: Jan. 24, 1983
[51] Int. Cl.³ .............................................. B61D 45/00
[52] U.S. Cl. ..................................... 410/148; 410/142; 211/123; 211/7; 211/105.3; 211/192; 248/222.1
[58] Field of Search ................ 211/124, 123, 7, 105.1, 211/105.3, 206, 208, 192; 248/222.1, 222.2; 410/142, 143, 144, 145, 148, 149

[56] References Cited
U.S. PATENT DOCUMENTS 2,056,544 10/1936 Vanderveld ...................... 211/123
2,980,037 4/1961 Elsner ................................ 410/144
4,033,268 7/1977 Klekar ............................... 410/149

FOREIGN PATENT DOCUMENTS 2533647 2/1977 Fed. Rep. of Germany ...... 211/124
2044079 10/1980 United Kingdom ................ 211/192
2044094 10/1980 United Kingdom ................ 211/124

Primary Examiner—J. Franklin Foss
Assistant Examiner—Blair Johnson
Attorney, Agent, or Firm—Sim & McBurney

[57] ABSTRACT

A garment hanger bar for the trailer transportation of garments includes a tubular member having swing bars comprising rings rotatably mounted on the tubular member and an elongate rod joining the rings and spaced from the tubular member for the locking of a plurality of garment hangers thereon to prevent their removal during transportation. The tubular member has mounting elements which project into and are secured in vertical slots with a release bolt extending into the slot at one end. Upon retraction of the release bolt, the mounting member at that end may be removed from the slot, and the hanger bar thereby released from its mounting. In another embodiment, a heavy duty support bar of rectangular cross section is provided for supporting pallets. Pairs of mounting elements are provided at each end of the support bar.

12 Claims, 11 Drawing Figures

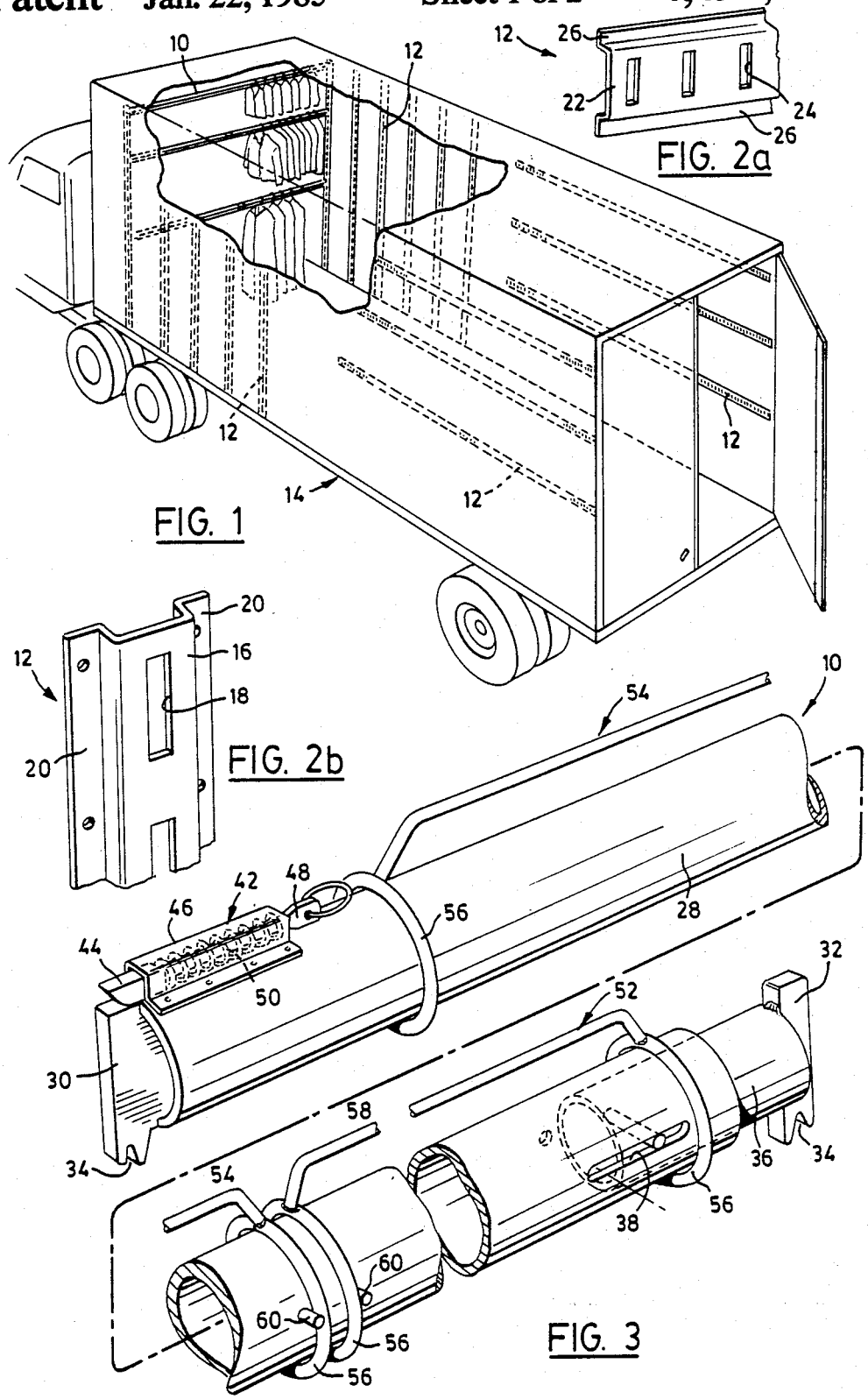

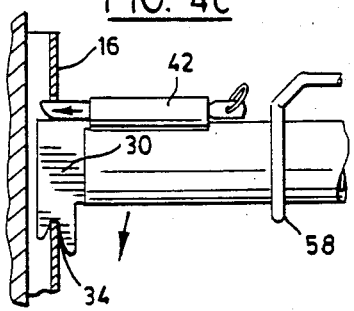
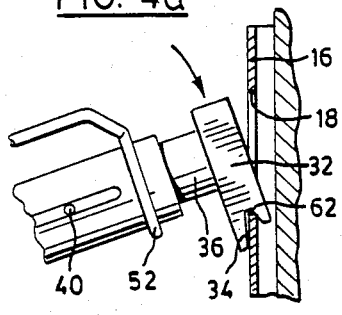
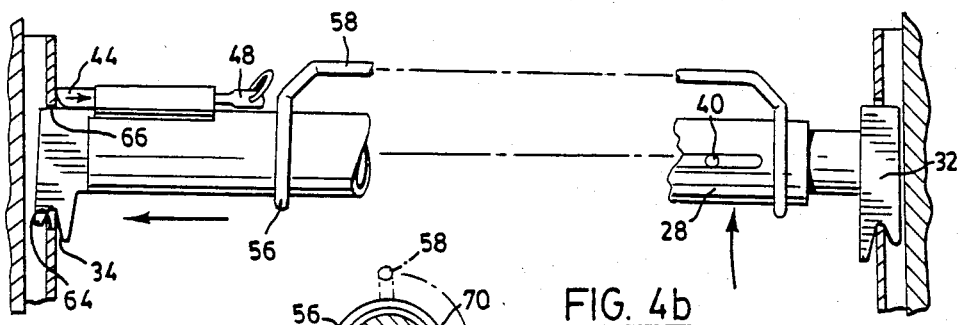
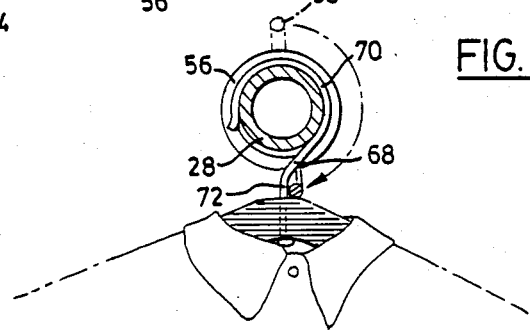
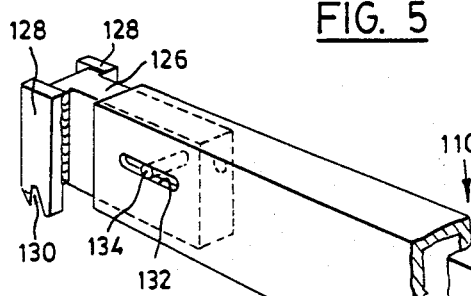
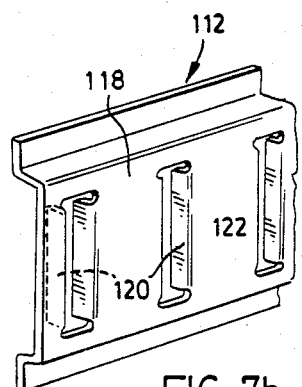
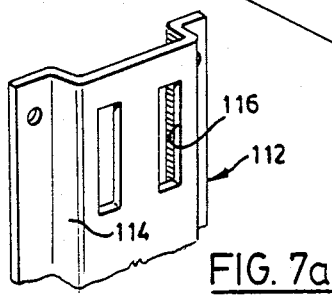
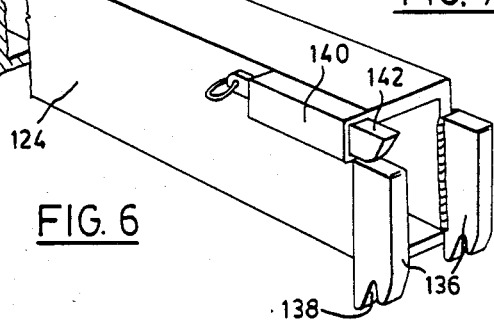

SUPPORT BAR

FIELD OF INVENTION

The present invention relates to support bars, especially to hanger bars suitable for the hanging of garments in vehicles.

BACKGROUND TO THE INVENTION

Hanger bars for the hanging of garments in vehicles are known but suffer from a variety of drawbacks. Such hanger bars are not readily located and positioned in trailers and garments are not readily prevented from falling from the bars.

In order to locate the hanger bar in position in trailers, some hanger bars are sprung to bias against the side walls of the trailer. The biasing against the trailer walls often results in damage to the sidewalls and hence is generally unsatisfactory.

In another prior art system, pockets are provided on each side wall and an elongate bar is located in the pocket at both sides and taped into place. To hold the hangers on the bar, an elongate piece of wood, typically 1"×2" cross section, is placed on top of the hanger hooks and taped to the bar. Installation is time consuming and the result is unreliable.

SUMMARY OF INVENTION

In accordance with the present invention, there is provided a support bar suitable for supporting loads thereon. A hollow elongate load supporting bar has a sleeve telescopingly received in one end thereof in slidable non-rotatable relationship therewith. Mounting elements for mounting the support bar in an operative position are fixedly mounted to the sleeve and to the other end of the load supporting bar. Each of the mounting elements extends transverse to the axis of the load supporting bar and has a transversely extending notch formed at the lower end thereof. One of the mounting elements has a vertical height which is less than the other. An elongate latch is mounted to the bar adjacent the other end thereof and includes a spring biased bolt element extending therefrom into vertical alignment with the lesser height mounting element to establish a combined physical height which is substantially the physical height of the greater height mounting element. The bolt is retractable against the spring biasing to enable the bar to be located in its operative position.

The support bar of the invention may be located in a trailer or the like by the use of attachment elements affixed to opposed walls of the trailer. The attachment elements have vertical slots to receive the mounting members therein. The greater physical height mounting element is first located in a slot at one end by hooking the notch over the lower edge of the slot and inserting the remainder of the mounting element into the slot. The slot is dimensioned so that the edges thereof engage the side faces and top face of the mounting element.

The telescoping relationship of the bar and sleeve permits the mounting element to be connected to the attachment element at the other side of the trailer by, with the spring biased bolt retracted, hooking the notch of the mounting element over the lower edge of the slot and releasing the bolt to lock the mounting element in place. The slot is dimensioned so that the sides engage the side faces of the mounting element and the top face of the bolt.

Usually, a plurality of support bars are located in a trailer, with horizontally extending or vertically extending mounting strips constituting the attachment elements. By providing a plurality of slots in such attachment elements, the support bars may be positioned at any desired location.

The support bar thereby is securely positioned within the trailer to receive loads thereon. In one embodiment of the invention, the support bar may take the form of a garment hanger bar, wherein the elongate load-supporting bar is tubular and has at least one swing bar mounted thereon. The swing bar comprises spaced apart rings which are rotatably mounted on the elongate bar and joined by a rod which is spaced from the bar. The swing bar is used to lock a plurality of garment hangers having hooks received on the tubular elongate element by rotating the rod from a location facing the open mouth of the hook to a location in engagement with the neck of the hook on the opposite side from the mouth. In this way, the garment hangers are prevented from accidental removal from the hanger rod during transportation.

In another embodiment of the invention, a heavy duty support bar may be provided for use with a pallet storage system. In this embodiment of the invention, the support bar has a rectangular cross section and two mounting elements are provided at each end of the support bar.

BRIEF DESCRIPTION OF DRAWINGS

FIG. 1 is a perspective view of a trailer modified to use the hanger bars of the invention;

FIG. 2a is a perspective view of a horizontal attachment strip to be affixed to the interior of the trailer and to act as a mount for the hanger bar;

FIG. 2b is a perspective view of a vertical attachment strip to be affixed to the interior of the trailer and to act as an alternative form of mount for the hanger bar;

FIG. 3 is a perspective view of a hanger bar constructed in accordance with one embodiment of the invention;

FIGS. 4a, 4b and 4c illustrate the sequence for attachment of the hanger bar to mounting strips located on opposite sides of the trailer, FIG. 5 is a cross sectional view of the hanger bar illustrating activation of the locking mechanism;

FIG. 6 is a perspective view of a different form of support bar, especially adapted for use for pallet loading at different levels in a truck;

FIG. 7a is a perspective view of a vertical attachment strip for utilization in connection with the support bar of FIG. 6; and FIG. 7b is a perspective view of a horizontal attachment strip for utilization in connection with the support bar of FIG. 6.

DESCRIPTION OF PREFERRED EMBODIMENT

Referring first to FIGS. 1 to 5, there is illustrated therein a garment hanger system for a trailer. The garment hanger system comprises a garment hanger bar or rod 10 which is mounted to mounting strips 12 located on opposite longitudinal sides of the interior of a trailer 14. The mounting strips 12 are arranged either as opposed pairs of upright strips or as opposed pairs of horizontal strips. For illustrative purposes, both forms of mounting strips 12 are illustrated in FIG. 1. Typically, a plurality of hanger bars is located in the trailer 14 to enable garments 15 to be mounted therein for transportation and/or storage in the trailer 14.

As may be seen in FIG. 2a, the vertical mounting strips 12 may take the form of a vertical channel shaped member 16 having vertically-aligned vertical slots 18 formed therethrough. Flanges 20 extend outwardly from the channel-shaped member 16 and enable the mounting strip 12 to be attached to the interior of the wall of the trailer 14. The provision of the plurality of vertical slots 18 in the height of strip 12 enables the garment hanger bar 10 to be located at any desired vertical height in the trailer 14 or a plurality of such bars 10 to be located at differing vertical heights. The provision of a plurality of parallel vertical strips 12 enables the hanger bar 10 to be located at any desired location within the length of the trailer 14 or a plurality of such bars to be located at differing locations within the length of the trailer 14.

As may be seen in FIG. 2b, the horizontal mounting strips 12 may take the form of a horizontal channel-shaped member 22 having parallel vertically-extending slots 24 formed therethrough. Flanges 26 extend upwardly and downwardly from the channel-shaped member 22 and enable the mounting strip 12 to be attached to the interior of the wall of the trailer 14. The provision of the plurality of vertical slots 24 in the length of the strip 12 enables the garment hanger bar 10 to be located at any desired location whtin the length of the trailer 14 or a plurality of such bars to be located at differing locations within the length of the trailer 14.

The hanger bar or rod 10 comprises an elongate tubular member 28 and mounting elements 30 and 32 located at the opposite ends thereof. The mounting elements 30 and 32 each comprises an elongate bar of generally rectangular cross section and a V-notch 34 formed in the lower end and extending transversely to the axis of the tubular member 28. The width of the mounting elements 30 and 32 corresponds to the width of the slots 18 and 24 in the mounting strips 12. The vertical distance between the vertical extremity of the notch 34 of the mounting element 32 and the top of that element corresponds to the vertical height of the slots 18 and 24 in the mounting strips 12. In the case of the mounting element 30, however, this vertical distance is less than the vertical height of the slots 18 and 24, for reasons which are explained below.

The mounting element 30 is connected in fixed relationship with the tubular member 28 while the mounting element 32 is mounted to a sleeve 36 which is telescopingly received in the tubular member 28 to assist in mounting the bar 28 in the trailer 14, as described below. An elongate slot 38 is provided in the wall of the tubular member 28 and receives a pin 40 in sliding relationship therewith. The pin 40 is fixedly mounted to the sleeve 36 and, by reason of sliding engagement with the slot 38, prevents rotation of the sleeve 36 within the tubular member 28 and provides limit stops for extents of motion of the sleeve 36. The telescoping potential of the sleeve 36 assists in mounting the hanger bar 10 in the trailer 14, as described in more detail below.

Adjacent the mounting element 30 is a spring latch 42 mounted to the exterior of the tubular member 28 and extending axially thereof. The spring latch 42 includes a bolt 44 which extends forwardly from a housing 46 adjacent the upper surface of the mounting element 30, the distance from the notch 34 to the upper surface of the bolt 44 corresponding to the vertical dimension of the slot 18 or 24.

The bolt 44 is received in a housing 46 and is connected to a pull element 48 located at the opposite end of the housing. An expansion spring 50 is located in the housing 46 in operative relation with the bolt 44 normally to extend the bolt 44 from the housing 46 as shown in FIG. 3. The bolt 44 may be retracted, however, into the housing 46 against the action of the spring 50 by drawing on the pull element 48. Upon release of the pull element 48 the action of the spring 50 restores the bolt 44 to its extended position. This operation is used in the mounting of the hanger bar 10 in the trailer 14.

A pair of swing rods 52 and 54 are mounted to the tubular member 28. Although two swing rods are illustrated any number of swing rods may be used, depending on the length of hanger rod and convenience in use. The swing rod 52 and 54 each comprise a pair of rings 56 rotatably mounted on the tubular element 28 and an elongate rod 58 joined to both rings 56 and spaced from the surface of the tubular member 28. Stops 60 may project from the tubular member 28 to prevent longitudinal movement of the swing rods 52 and 54 towards the mounting elements 30 and 32.

Assembly of the hanger bar 10 with the mounting strips 12 is illustrated in FIGS. 4a to 4c. As shown herein, the first stop (FIG. 4a) is to locate the notch 34 at the lower end of the mounting element 32 over and in engagement with the lower edge 62 of the slot 18 in the mounting strip 12 attached to one side of the trailer 14 (or slot 24, if a horizontal mounting strip is used) with the hanger bar 10 angled downwardly from the horizontal. The hanger bar 10 then is raised towards and past the horizontal position, the tubular member 28 being slid towards the mounting element 32 to facilitate moving the mounting element 30 past the slot 18 in the mounting strip 12 attached to the opposite side of the trailer 14.

Once the action is completed, the mounting 30 is inserted into the slot 18, with the tubular member 28 sliding relative to the sleeve 36 to facilitate this action. The bolt 44 is retracted by pulling on the pull element 48 or by permitting engagement between the outer face of the channel member and bolt 44 to retract against the action of the spring 50. The notch 34 at the lower end of the mounting element 30 is located over the lower edge 64 of the slot 18 (see FIG. 4b). The mounting element 30 is moved downwardly into engagement with the lower edge 64. As the bolt 44 clears the upper edge 66 of the slot 18, the action of the spring 50 projects the bolt 44 into the opening to lock the hanger bar 10 into place (see FIG. 4c).

By this operation, the hanger bar 10 is positively and securely positioned in the mounting strips 12 and ready for use. If desired to be released from the mounting strips 12 for removal from the trailer 14 or for relocation within the trailer 14, the reverse procedure may be adopted.

The hanger bar 10 is used for racking a plurality of clothing hangers 68 thereon. The clothing hangers 68 conventionally have a hook member which partially surrounds the tubular member 28, so as to be supported thereby. During racking of the hangers 68 on the tubular member 28, the swing rods 52 and 54 are located with the rods 58 facing the open part of the hook.

When the hangers 68 have been positioned on the tubular members 28, the rods 58 are moved by rotation of the rings 56 through almost a full circle into engagement with the neck 72 of the hangers 68, so as to lock the hangers 68 on the tubular member 28 and prevent their removal from the bar 10 during transportation in the trailer 14. The swing rods 52 and 54, therefore, act to hold the garments 15 on the hanger rod 10 in a position which inhibits removal therefrom, until the rods 58 are rotated in the opposite direction to their original position.

The garment hanger system illustrated in FIGS. 1 to 5, therefore, is versatile in enabling a plurality of hanger rods to be fixedly located in releasable manner at any desired horizontal or vertical location in a trailer. Each hanger rod can receive a plurality of garment hangers which can be simultaneously locked into position to prevent accidental removal therefrom during transportation. The garment hanger systen thereby is able to overcome the problems of the prior art.

Turning now to consideration of FIGS. 6, 7a and 7b, there is illustrated therein a heavy duty bar 110 suitable for pallet loading at different levels in the trailer. The principle of mounting to mounting strips 112 is the same as for the garment bar 10. In this instance however, vertically-extending mounting strip 114 has a pair of parallel vertically-extending slots 116 therethrough, while the horizontally-extending mounting strip 118 has a pair of parallel vertically-extending slots 120. As illustrated in FIG. 7b, the slots 120 may be provided with stiffening flanges 122 extending rearwardly from side edges of the slots 120.

The heavy duty support bar 110 comprises a rectangularly cross-sectioned elongate hollow member 124 which has a rectangularly cross-sectioned sleeve member 126 slidably located in one end thereof. The sleeve member 126 has a pair of mounting elements 128 each dimensioned the same as the slots 116 or 120 and spaced apart the same distance as the slots 116 or 120, so as to be received therein. Each of the mounting elements 128 has a notch 130 located in the lower end thereof to hook over the lower end of the slots 116 or 120. An elongate slot 132 in formed in the side wall of the hollow member 124 and receives a pin 134 in sliding relation thereto to limit the extremities of movement of the sleeve member 126.

At the opposite end of the support bar 110 from the mounting elements 128 are an additional pair of mounting elements 136, each of which has a notch 138 located in the lower end thereof to hook over the lower end of the slots 116 or 120. The mounting elements 136 have less height than the slots 116 and 120 to enable the same to be inserted in the slots during assembly. A spring latch 140 is provided adjacent the mounting elements 136 and includes a bolt 142 which locks the mounting elements 136 in place.

Assembly of the heavy duty support bar 110 with the mounting strips 112 is achieved in analogous manner to that described above with respect to the garment hanger rod 10 in FIGS. 4a, 4b and 4c. The heavy duty support bar 110 provides the same manner of versatility of location and positive positioning at such locations as for the garment hanger rod 10 described with respect to FIGS. 1 to 5.

SUMMARY OF THE DISCLOSURE

In summary of this disclosure, the present invention provides a support rod system which is versatile in location but which is sturdy when located in the desired position. Modifications are possible within the scope of the invention.

What I claim is:

1. A load support system, comprising:
   first and second support elements horizontally spaced apart one from another, each said support element having a vertically-elongated opening therein, each said opening having substantially the same dimension and having a lower and an upper edge which are in substantially horizontal alignment,
   elongate load support bar means having axially relatively-movable members and vertically-elongate one-piece mounting elements fixedly mounted at opposite ends of said load support bar means,
   each said mounting element having a transversely-extending notch formed in the lower end thereof to enable the mounting element to hook over said lower edge of the elongate opening, said notches being located relative to said support bar means such that a straight line drawn between the notches extends parallel to the axis of the support bar means, each said mounting element having a transverse dimension which is the same as that of the elongate opening, so that the side edges of the opening engage the side faces of the mounting element when located therein;
   one of said mounting elements having a vertical height from the upper extremity of the notch therein to the upper extremity of the mounting element which is substantially equal to the length of the elongate opening, so that the top edge of the opening engages the upper face of said one mounting element when located thereon, and the other of said mounting elements having a vertical height from the upper extremity of the notch therein to the upper extremity of the mounting element which is less than the length of the elongate opening, and
   latch means mounted to said support bar means adjacent said other one of the mounting elements, said latch means having a spring biased bolt element extending therefrom into the opening between the upper extremity of the other mounting element and the upper edge of the opening to engage the side edges and upper edge of the opening and lock said support bar means to said support elements in a horizontal position,
   said spring biased bolt being retractable from the opening against the spring bias to enable said other mounting element to be unhooked from the opening and thereby the support bar means to be released from the support elements.

2. The system of claim 1, wherein said first and second support elements are constituted by vertical channel-shaped members having a plurality of said elongate openings therein in vertical alignment.

3. The system of claim 1, wherein said first and second support elements are constituted by horizontal channel-shaped members having a plurality of said elongate openings therein in parallel.

4. The system of claim 1 wherein said load support bar means comprises a tubular bar member and a sleeve telescopingly received in one end thereof in slidable non-rotatable relationship therewith.

5. The system of claim 1 wherein said load support bar means comprises a rectangularly cross-section bar member and a sleeve telescopingly received in one end thereof in slidable relationship therewith.

6. The system of claim 4 wherein said first and second support elements are constituted by vertical channel-shaped members having a plurality of said elongate openings therein in vertical alignment.

7. The system of claim 4 wherein said first and second support elements are constituted by horizontal channel-shaped members having a plurality of said elongate openings therein in parallel.

8. The system of claim 4, wherein said tubular bar member has at least one locking bar means mounted thereon to lock a plurality of garment hangers received on said tubular bar member thereto.

9. The system of claim 8, wherein said locking bar means comprises a pair of longitudinally-spaced apart ring members rotatably mounted on the tubular bar member and a rod member joining the ring members and spaced apart from the outer surface of the elongate bar, whereby in its non-locking position, the rod member is located opposite the open throat of C-shaped garment hanger hooks received on the tubular bar member and, in its locking position, the rod is rotated to be located in engagement with a neck of the garment hanger hooks on the opposite side from the throat.

10. The system of claim 9, wherein said first and second support elements are constituted by vertical channel-shaped members having a plurality of said elongate openings therein in vertical alignment.

11. The system of claim 9, wherein said first and second support elements are constituted by horizontal channel-shaped members having a plurality of said elongate openings therein in parallel.

12. In a motor-vehicle trailer having an enclosed storage area and upright side walls, the improvement which comprises a load support system located in said enclosed storage space comprising:
- a first plurality of parallel channel-shaped support elements fixedly attached to one side wall of the trailer and a second plurality of parallel channel-shaped support elements fixedly attached to the other side wall of the trailer in transverse alignment with the first plurality of support elements,
- a plurality of vertically-extending slots formed in said support elements throughout substantially the vertical height of the support elements to constitute a plurality of attachment points in the length and height of the trailer,
- at least one elongate support bar means located in said trailer, said support bar means having axially relatively-movable members and vertically-elongate one-piece mounting members at opposite ends of said load support bar means,
- each said mounting member having a transversely-extending notch formed in the lower end thereof to enable the mounting member to hook over said lower edge of the vertically-extending slots, said notches being located relative to said support bar means such that a straight line drawn between the notches extends parallel to the axis of the support bar means, each said mounting member having a transverse dimension which is the same as that of the slot, so that the side edges of the slot engage the side faces of the mounting member when located therein;
- one of said mounting members having a vertical height from the upper extremity of the notch therein to the upper extremity of the mounting member which is substantially equal to the length of the slot, so that the top edge of the slot engages the upper face of said one mounting member when located thereon, and the other of said mounting members having a vertical height from the upper extremity of the notch therein to the upper extremity of the mounting member which is less than the length of the slot, and
- latch means mounted to said support bar means adjacent said other one of the mounting members, said latch means having a spring biased bolt element extending therefrom into the slot between the upper extremity of the other mounting member and the upper edge of the slot to engage the side edges and upper edge of the slot and lock said support bar means to said support elements in a horizontal position,
- said spring biased bolt being retractible from the slot against the spring bias to enable said other mounting member to be unhooked from the opening and thereby the support bar means to be released from the support elements.

* * * * *